US008387739B2

(12) United States Patent
Ishihara et al.

(10) Patent No.: US 8,387,739 B2
(45) Date of Patent: Mar. 5, 2013

(54) SHIFT DEVICE

(75) Inventors: Yoko Ishihara, Saitama (JP); Atsushi Komatsu, Saitama (JP); Yoshikazu Nishikawa, Saitama (JP); Tatsuya Okuhara, Saitama (JP); Takahiro Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 12/741,283

(22) PCT Filed: Oct. 27, 2008

(86) PCT No.: PCT/JP2008/069437
§ 371 (c)(1),
(2), (4) Date: Jul. 29, 2010

(87) PCT Pub. No.: WO2009/060740
PCT Pub. Date: May 14, 2009

(65) Prior Publication Data
US 2011/0036194 A1 Feb. 17, 2011

(30) Foreign Application Priority Data
Nov. 5, 2007 (JP) ................................ 2007-287322

(51) Int. Cl.
*B60K 20/08* (2006.01)
(52) U.S. Cl. ........................................ 180/336; 74/473.3
(58) Field of Classification Search .................. 180/336, 180/333, 334; 74/473.32, 473.1, 473.3, 473.31, 74/473.33; 280/731
See application file for complete search history.

(56) References Cited

U.S. PATENT DOCUMENTS

| | | | | | |
|---|---|---|---|---|---|
| 2,910,885 | A | * | 11/1959 | Bevacqua | 74/473.3 |
| 2,933,945 | A | * | 4/1960 | Brewster et al. | 74/473.3 |
| 2,933,946 | A | * | 4/1960 | Thompson | 74/473.3 |
| 2,983,160 | A | * | 5/1961 | Hause | 74/473.3 |
| 3,018,669 | A | * | 1/1962 | Bennett | 74/473.3 |
| 3,301,086 | A | * | 1/1967 | Willimas et al. | 74/473.3 |
| 3,844,180 | A | * | 10/1974 | Williams et al. | 74/473.3 |
| 3,901,097 | A | * | 8/1975 | Williams et al. | 74/473.3 |
| 3,917,021 | A | * | 11/1975 | Williams et al. | 180/271 |
| 4,180,713 | A | * | 12/1979 | Gonzales | 200/52 R |
| 4,352,401 | A | * | 10/1982 | Vitaloni | 180/90 |

(Continued)

FOREIGN PATENT DOCUMENTS

| | | |
|---|---|---|
| JP | 61-036820 A | 2/1986 |
| JP | 61-075026 U | 5/1986 |

(Continued)

*Primary Examiner* — Drew Brown
(74) *Attorney, Agent, or Firm* — Carrier Blackman & Associates, P.C.; William D. Blackman; Joseph P. Carrier

(57) ABSTRACT

There is provided a shift device of which visibility and operability is excellent. The shift device 1 includes a shift lever 5 which operates a gear position of a transmission. The shift lever is arranged in an area R1 of an instrumental panel 11 which is outside of a steering wheel 20 and upper than the center axis O of the steering wheel 20 from the viewpoint of the driver and protruding toward the driver. A center part of the steering wheel 20 is provided with an air bag system, and the shift lever 5 is arranged in an expansion area of an air bag of the air bag system from the viewpoint of the driver.

6 Claims, 9 Drawing Sheets

U.S. PATENT DOCUMENTS 4,691,587 A * 9/1987 Farrand et al. ................. 74/493
7,648,001 B2 * 1/2010 Yanagihara et al. .......... 180/336

FOREIGN PATENT DOCUMENTS

| | | | |
|---|---|---|---|
| JP | 3227728 A | 10/1991 |
| JP | 05-246260 A | 9/1993 |
| JP | 10-053039 A | 2/1998 |
| JP | 2006-027472 A | 2/2006 |
| JP | 2006-527120 T | 11/2006 |

* cited by examiner

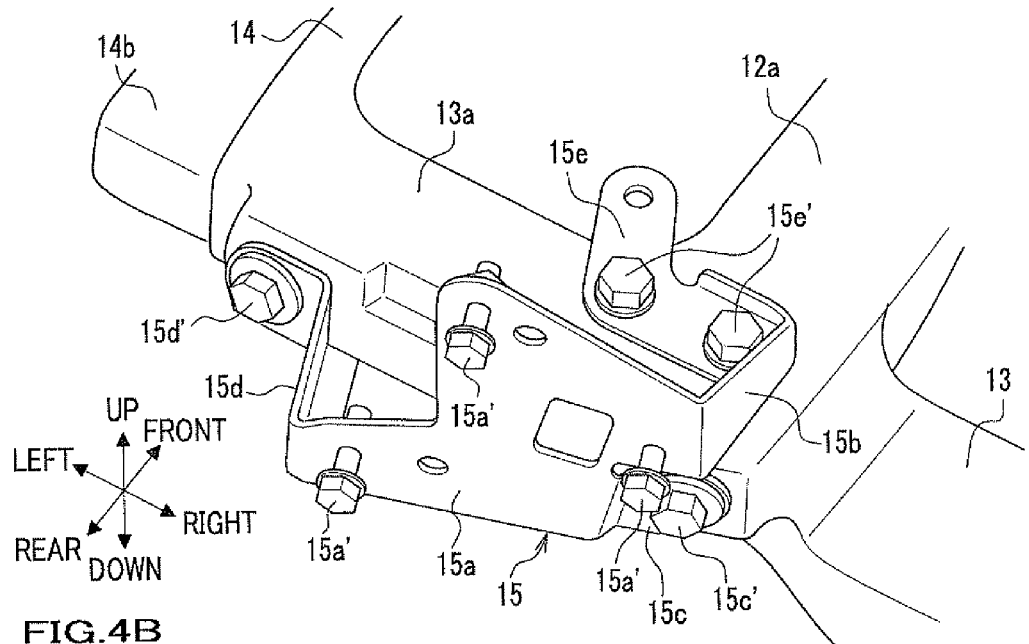
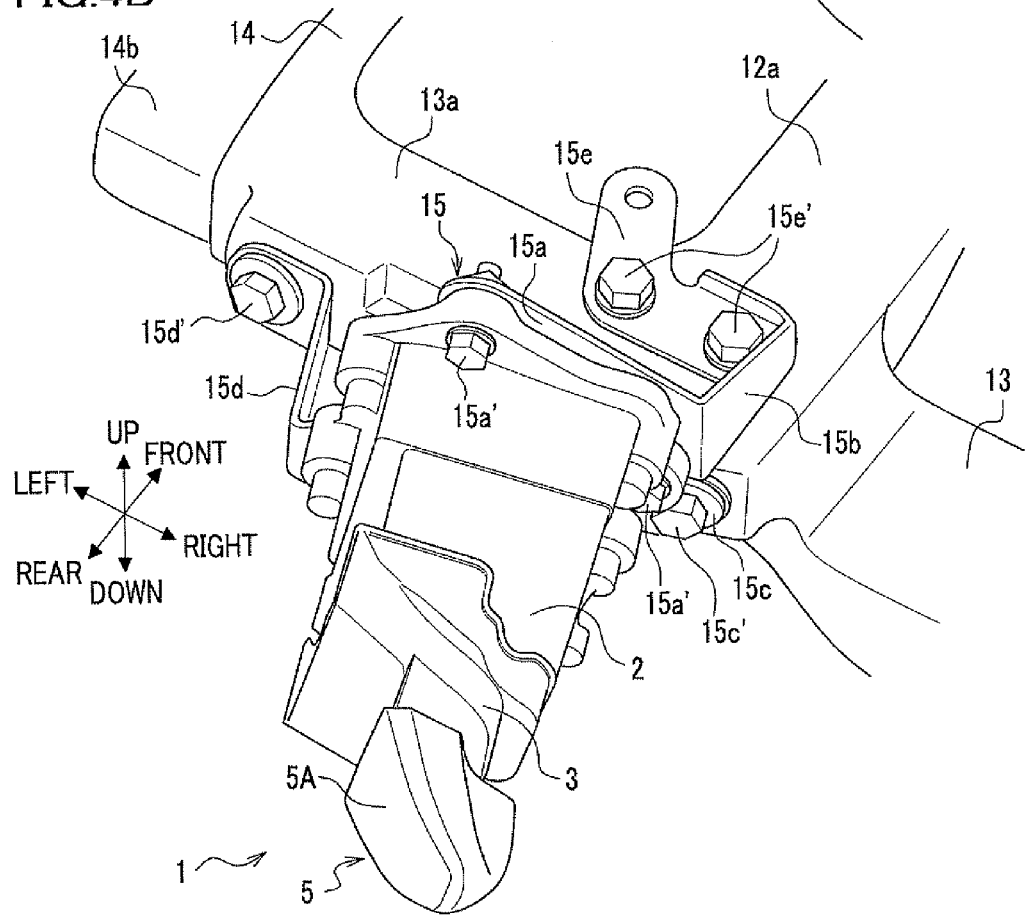

SHIFT DEVICE

BACKGROUND OF THE INVENTION

1. Field of the Invention

The present invention relates to a shift device for switching a running range of an automatic transmission provided in a vehicle such as an automobile.

2. Description of the Related Art

Conventionally, a shift device is generally arranged on a center console which is provided between the right and left front sheets, however, there has been recently proposed a shift device which is arranged in the vicinity of a steering wheel for enlarging a space in a vehicle cabin to enhance its layout capability.

For example, Japanese Patent No. 2933965 discloses a shift device which is provided on a side of a steering column. Japanese Unexamined Patent Application Publication No. 05-246260 discloses a shift device provided in a part of an instrumental panel.

However, the shift devices disclosed in Japanese Patent No. 2933965 and Japanese Unexamined Patent Application Publication No. 05-246260 have a problem that it is difficult for a driver to see a shift lever since the shift lever is hidden by the steering wheel. These shift devices also have a problem that their operability is not good since the shift lever is arranged in the operating range of a wiper control lever from the viewpoint of the driver.

The shift device disclosed in Japanese Unexamined Patent Application Publication No. 05-246260 also has a problem that its operability is deteriorated because the shift device is provided on the same height level as the steering wheel shaft or below the height level of the steering wheel shaft (similarly to a general shift device arranged on an instrumental panel) and the shift device is arranged away from the steering wheel.

The present invention has been made in view of above problems, and an object thereof is to provide a shift device having excellent visibility and operability.

In order to achieve the object, a first aspect of the present invention provides a shift device including a shift lever which operates a gear position of a transmission and a home position to which the shift lever automatically returns after an operation of the shift lever. The shift lever is arranged in a meter visor surrounding a display device displaying a status of a vehicle and in an area which is outside of a steering wheel and upper than the center axis of the steering wheel from a view point of a driver and protruding toward the driver. The shift lever is always moved toward the steering wheel when the shift lever is moved to each of the gear position from the home position.

In accordance with the shift device, since the shift lever is not hidden by the steering wheel from the viewpoint of the driver and the shift lever is arranged in the meter visor surrounding the display device displaying the status of the vehicle and in the area upper than the center axis of the steering wheel which is likely to be seen in the peripheral vision of the driver M, the position of the shift lever can be easily recognized, providing an excellent visibility. The driver's visual line can be smoothly moved from the display device to the shift lever. As the shift lever is arranged in the meter visor and protrudes toward the side of the driver, the operation of the shift lever is not obstructed by other operation switches (a blinker switch or a washer switch) which are provided to a steering column. Thus, the operability of the shift lever is enhanced. It is also possible to operate the shift lever easily just by extending the hand gripping the steering wheel toward the meter visor in front of the steering wheel. Thus, the shift device can be realized of which operability is further enhanced. The shift device also realizes a natural operation feeling and allows a smooth shift operation since the shift lever can be operated just by extending the hand gripping the steering wheel to the meter visor in front of the steering wheel.

As the shift lever is arranged above the center axis of the steering wheel, the shift lever can be arranged in the vicinity of the steering wheel, which further enhances the operability of the shift lever. If the shift lever is not arranged in the area upper than the center axis of the steering wheel but is arranged to the side of the center shaft of the steering wheel, the shift lever is positioned away from the steering wheel, which deteriorates the operability of the shift lever. If the shift device is arranged lower than the center axis of the steering wheel, the shift device needs to be arranged in a position other than the driving sheet, which makes the shift lever away from the steering wheel, deteriorating the operability of the shift lever.

In contrast, in the present invention, as the shift lever is arranged in an area upper than the center shaft of the steering wheel, the shift lever is positioned in the vicinity of the steering wheel, which enhances the operability of the shift lever.

In accordance with the shift device, the shift lever is not hidden by the steering wheel from the viewpoint of the driver. Further, since the shift lever is arranged in the area of the instrumental panel upper than the center axis of the steering wheel which is likely to be seen in the peripheral vision of the driver M, the position of the shift lever can be easily recognized, providing an excellent visibility. As the shift lever is arranged in the area of the instrumental panel and protrudes toward the side of the driver, the operation of the shift lever is not obstructed by other operation switches (a blinker switch or a washer switch) which are provided to a steering column. Thus, the operability of the shift lever is enhanced.

As the shift lever is arranged above the center axis of the steering wheel, the shift lever can be arranged in the vicinity of the steering wheel, which further enhances the operability of the shift lever. If the shift lever is not arranged in the area upper than the center axis of the steering wheel but is arranged to the side of the center shaft of the steering wheel, the shift lever is positioned away from the steering wheel, which deteriorates the operability of the shift lever. If the shift device is arranged lower than the center axis of the steering wheel, the shift device needs to be arranged in a position other than the driving sheet, which makes the shift lever away from the steering wheel, deteriorating the operability of the shift lever.

In contrast, in the present invention, as the shift lever is arranged in an area upper than the center shaft of the steering wheel, the shift lever is positioned in the vicinity of the steering wheel, which enhances the operability of the shift lever.

In the aforementioned shift device, it is preferable that a center part of the steering wheel is provided with an air bag system, and the shift lever is arranged in an expansion area of an air bag of the air bag system from the viewpoint of the driver.

In the shift device, when the air bag system is operated and the air bag is expanded due to an impact applied by a collision, the air bag is expanded between the shift lever and the driver. Thus, the expanded air bag between the shift lever and the driver eliminates the risk that the shift lever comes in contact with the driver, which advantageously eliminates the need to provide a shock absorbing mechanism to the shift lever. In short, even if the shift lever protrudes toward the side of the driver, there is no need to provide a shock absorbing mechanism to the shift device, which makes the configuration of the shift device be simpler and reduces the manufacturing cost thereof.

In accordance with the present invention, the shift device of which visibility and operability are excellent can be provided.

BRIEF DESCRIPTION OF THE DRAWINGS

FIGS. 4A and 4B are views showing a mounting configuration of the shift device.

DESCRIPTION OF THE REFERENCE NUMERALS

Figure 1:
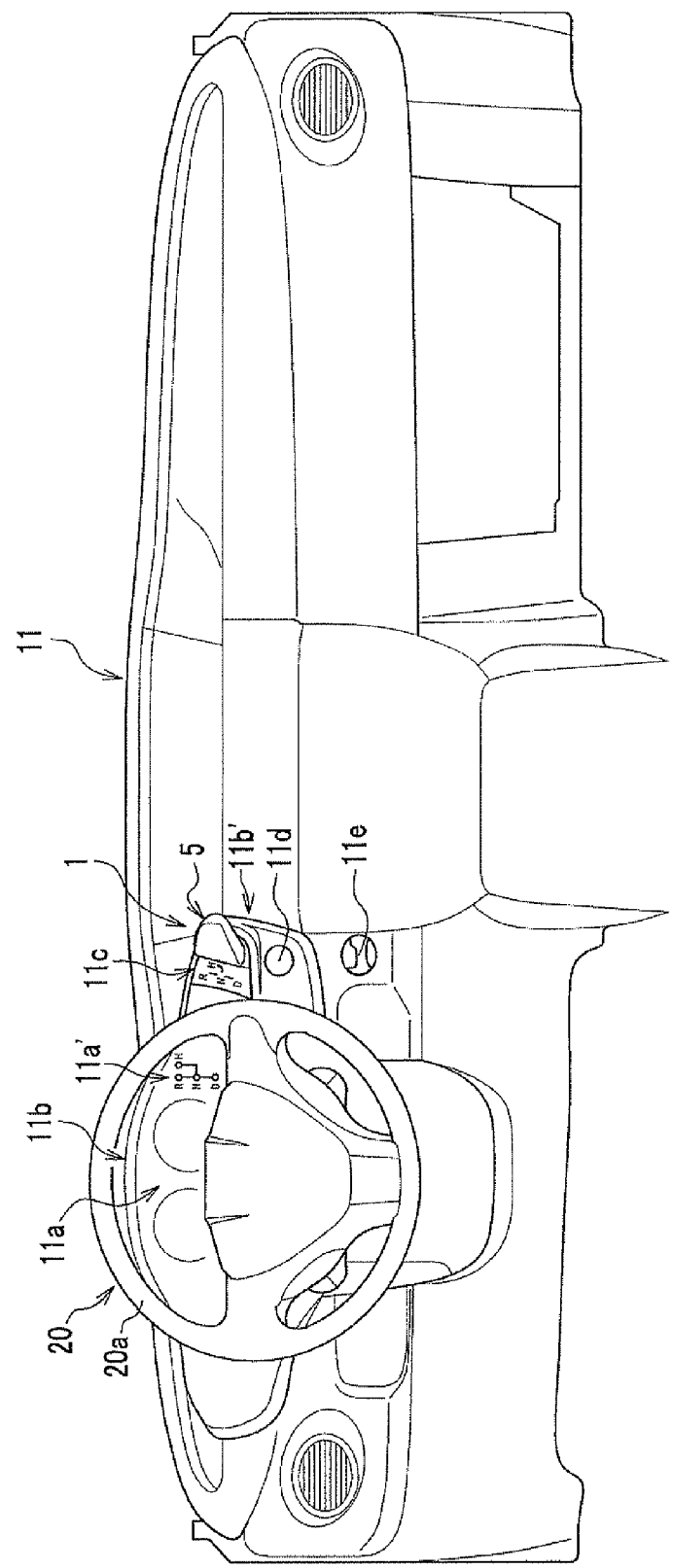
FIG. 1 is a view showing substantially entire configuration of an instrumental panel on which a shift device of an embodiment of the present invention is arranged.

1 Shift device
2 body
3 Escutcheon cover 3
5 Shift lever
5A Shift knob
5a Front portion
5b Bulged portion
5b' Right rear portion
5c Gap
5d Gap
11 Instrumental panel
11b Meter visor
11b' Right end portion
15 Mounting bracket
20 Steering wheel
20a Steering rim
40 Air bag system
41 Air bag
H Home position
M Driver
O Center axis

DETAILED DESCRIPTION OF THE PREFERRED EMBODIMENT

An embodiment of the present invention is described with reference to the accompanying drawings.

Figure 2:
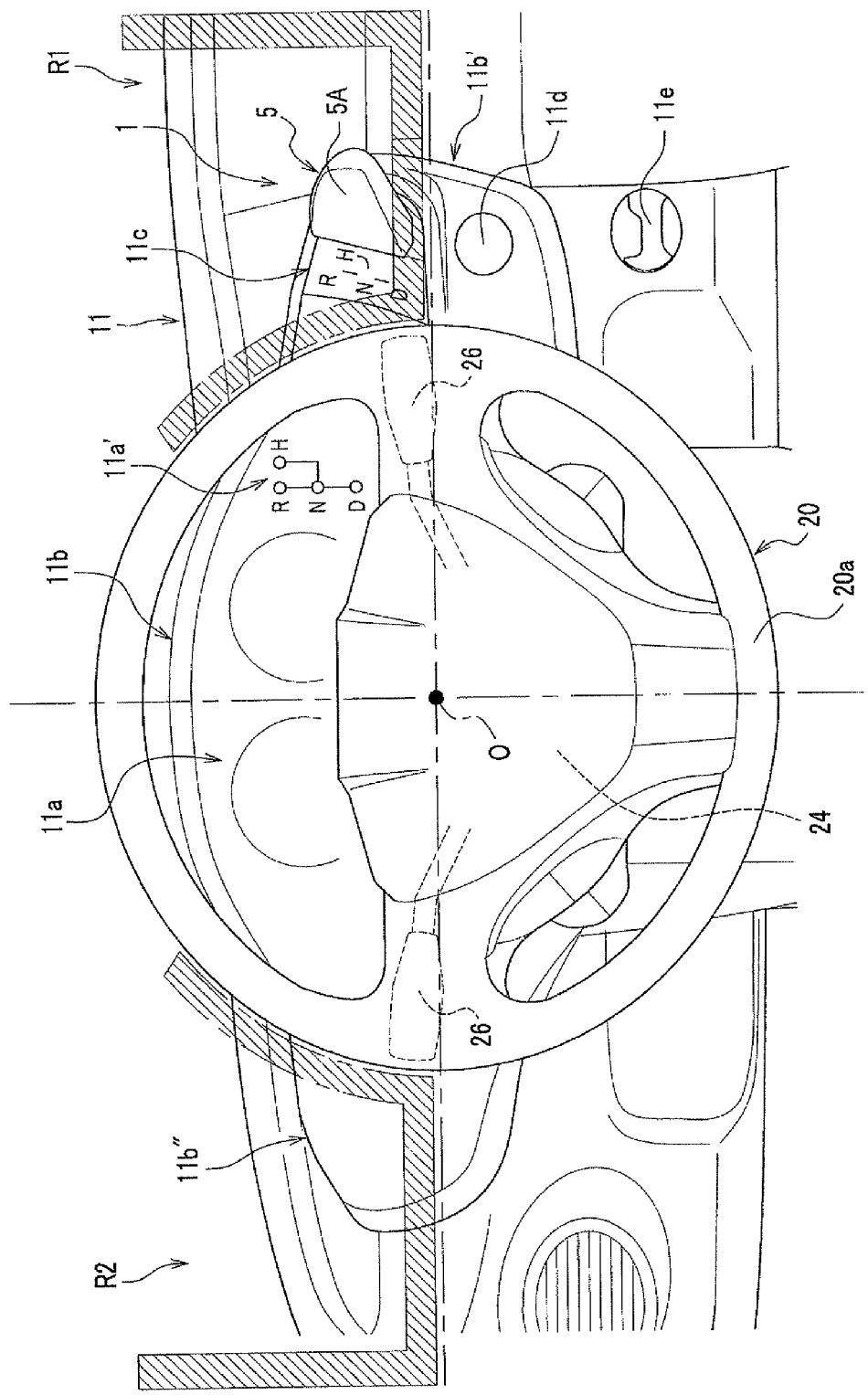
FIG. 2 is a view showing a position on which the shift device is arranged.
Figure 3:
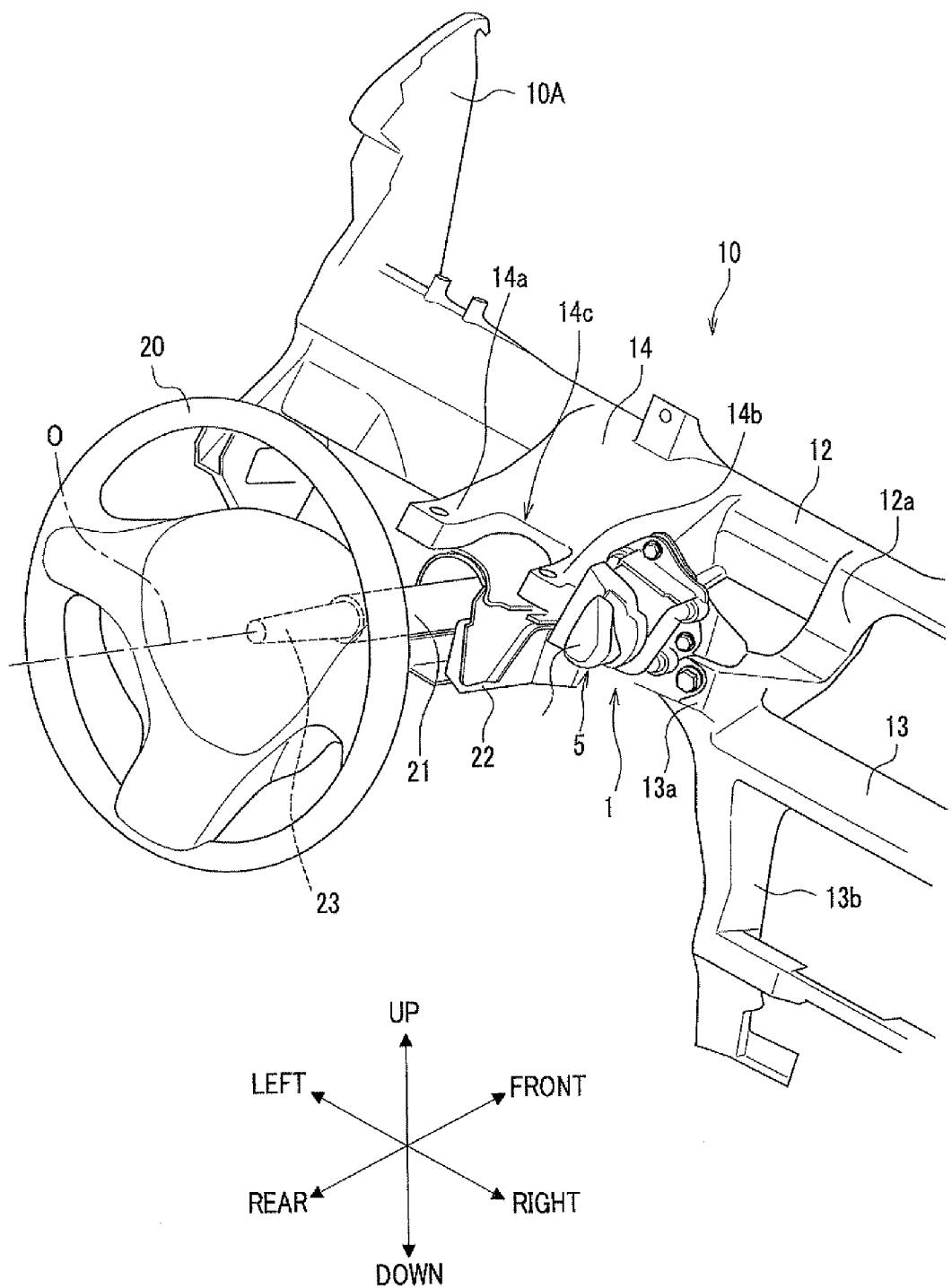
FIG. 3 is a perspective view showing a mounting state of the shift device on a steering hanger beam.

FIG. 1 is a view showing substantially entire configuration of an instrumental panel on which a shift device of the embodiment of the present invention is arranged. FIG. 2 is a view showing a position on which the shift device is arranged. FIG. 3 is a perspective view showing a mounting state of the shift device on a steering hanger beam. Hereinafter, directions of "front-back", "right-left", and "up-down" in this specification are the same as those of the shift device which is mounted on a vehicle body. Incidentally, a shift device 1 mounted on a vehicle body of an automobile is described hereinafter, however, the type of a vehicle with which the shift device 1 is provided is not limited to an automobile.

As shown in FIG. 1, the shift device 1 is arranged on a right end portion 11b' of a meter visor 11b of an instrumental panel 11 which is provided in front of front sheets (not shown) of a vehicle body. A shift lever 5 which is provided to the shift device 1 protrudes toward the side of a driver M (a driver sheet, see FIG. 6). Meter visor 11b includes a meter display part 11a including a speed meter or a tachometer. Provided below the shift lever 5 are a hazard lump switch 11d and an ignition switch 11e. The meter display part 11a is provided with a display part 11a' in which a current range of the shift device 1 is shown. In the embodiment, the display part 11a' is disposed on the left opposite side of the shift lever 5 with respect to a steering rim 20a from the viewpoint of the driver M (the display part 11a' is viewable through the inside of the steering rim 20a). The display part 11a' is arranged such that the steering rim 20 does not interfere with the visibility of the driver M to the display part 11a'.

In the embodiment, the right end portion 11b' of the meter visor 11b on which the shift device 1 (shift lever 5) is mounted is arranged in an area R1 which is outside of the steering wheel 20 and above the center shaft 0 of the steering wheel 20 from the viewpoint of the driver M as shown in FIG. 2. The shift lever 5 is also arranged in the area R1.

The instrumental panel 11 is mounted on a steering hanger beam 10 (hereinafter also referred to as "a hanger assembly 10"), and is disposed in front of the front sheets of the vehicle body. Vehicle width direction end portions 10A (only the end portion 10A of the left side is shown) of the hanger assembly 10 are connected to front pillars which form right and left side walls (not shown) of the vehicle body. The front side of the hanger assembly 10 includes a first steering hanger beam 12 which extends in a vehicle width direction over a whole width region of a vehicle cabin (a part of the vehicle cabin is shown), and a second steering hanger beam 13 which is disposed rear side of the first steering hanger beam 12 substantially in parallel to the first steering hanger beam 12. These first and second steering hanger beams 12, 13 are connected to each other by a column mounting bracket 14 in front of substantially center part of the driver sheet.

A left end portion of the second steering hanger beam 13 is formed a step higher in the upper direction, forming a mounting part 13a on which the shift device 1 is mounted. The right end portion of the mounting part 13a and the first steering hanger beam 12 is connected and reinforced by an intermediate stay 12a.

The rear part of the column mounting bracket 14 is branched into two parts 14a, 14b. The mounting member 22 of the steering column 21 is fixed by bolts (not shown) such that a part of the mounting member 22 is inserted into a cleared space 14c formed between the two parts 14a, 14b.

The steering column 21 supports the steering shaft 23 rotatably, and the steering wheel 20 is fixed at the distal end of the steering shaft 23 on the driver side.

A center frame 13b is provided below the second steering hanger beam 13 for supporting the front part of a center console (not shown).

As shown in FIG. 4B, the shift device 1 includes a body 2, an escutcheon cover 3 including a gate groove (not shown) and a shift lever 5 which is inserted into the escutcheon cover 3 in such a manner that the shift lever 5 is movable. The shift device 5 is mounted on a mounting portion 13a of hanger assembly 10 via a mounting bracket 15.

Figure 5A:
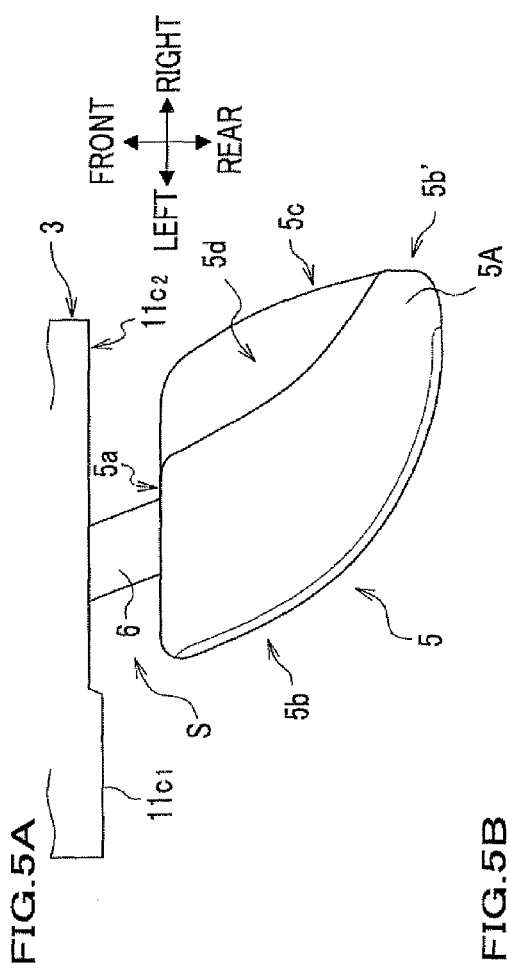
FIG. 5A is a plain view of the shift lever.

The shift device 1 according to the embodiment is applied to an automatic transmission (not shown). A shift operation signal corresponding to a shift operation is transmitted by a shift-by-wire system to an automatic transmission control unit (not shown) which controls to switch a running range of the automatic transmission. The body 2 includes in it's inside a shift lever position sensor (not shown) for detecting the position of the shift lever and a transmission device (not shown) for transmitting the shift operation signal. The escutcheon cover 3 is fixed such that the escutcheon cover 3 covers the rear end portion of the body 2, and is exposed to the driver side through an opening 11c (indicated by an arrow) of the meter visor 11b' of the instrumental panel 11 as shown in FIG. 2. As shown in FIGS. 5A and 5C, the shift lever 5 is inserted through the rear part of the escutcheon cover 3 through the gate groove (not shown). The shift lever 5 includes a shift knob 5A at its distal end. In the embodiment, the rear part of the escutcheon cover 3 where the shift lever is arranged (right side) is adapted to be a step surface 11c2 which is formed to be lowered by one step. With this step surface 11c2, a gap S between the step surface 11c2 and a front portion 5a of the shift knob 5A becomes wider. The gap S functions as a space which makes it easy for a driver to put his finger on the back side surface of the shift knob 5A when operating the shift lever 5 (described later).

Figure 5B:
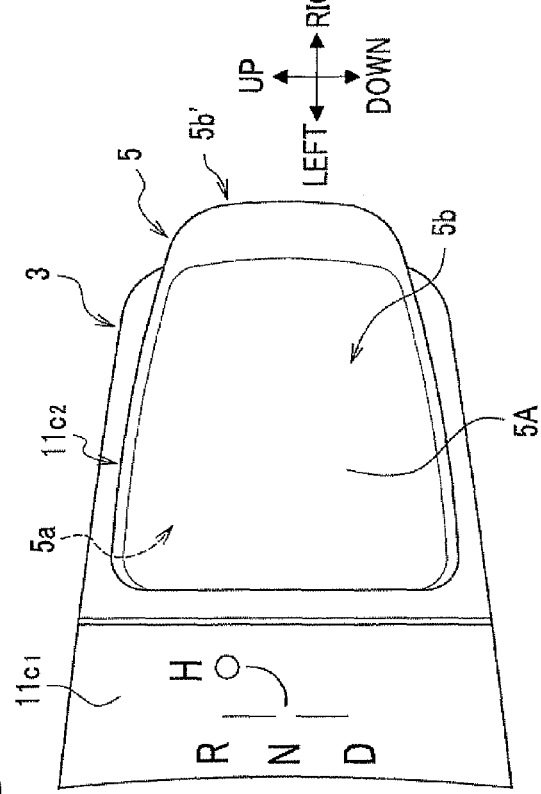
FIG. 5B is a view showing a rear surface of the shift lever.
Figure 5C:
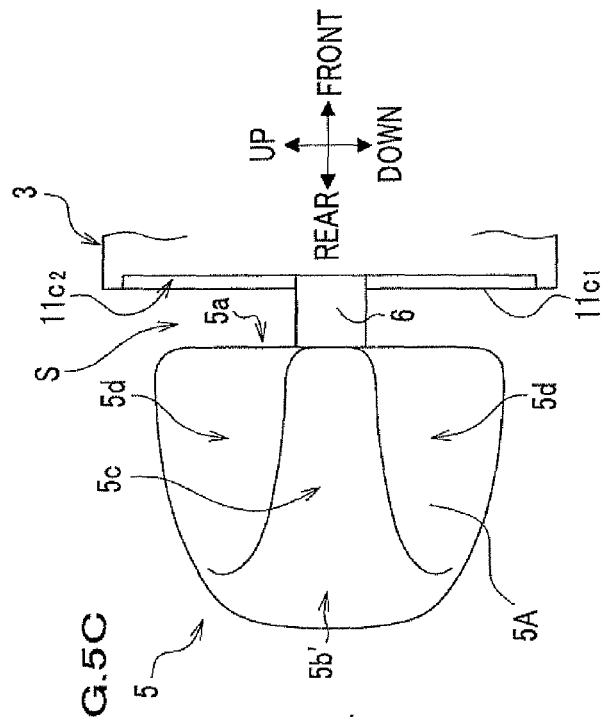
FIG. 5C is a right side view of the shift lever.

As shown in FIG. 5B, shift positions (a shift pattern) corresponding to the gate groove such as a reverse range "R", a neutral range "N" and a drive range "D" is shown on the rear left side $11c_1$ of the escutcheon cover 3.

The shift lever 5 includes, as shown in FIG. 5A, a supporting shaft 6 which is inserted through and held by the escutcheon cover 3 in a state that the supporting shaft 6 is inclined with respect to the escutcheon cover 3. The lower end of this supporting shaft 6 is supported inside of the body 2 (see FIG. 4B) by, for example, a pivot three-dimensionally rotatably. The supporting shaft 6 is inclined away from the center axis O (see FIG. 3) (toward the vehicle right side), whereby the shift knob 5A fixed at the distal end of the supporting shaft 6 is also inclined in the same direction as that of the supporting shaft 6.

The shift device 1 of the embodiment includes a momentary mechanism which automatically returns the shift lever 5 to a home position H by an energizing force of e.g. a spring (not shown) when a driver releases his hand from the shift lever 5. The shift device 1 may be configured such that the shift device 1 has a holding position such as the drive range "D" in which the shift lever 5 remains by a lock mechanism (not shown) even if the driver releases his hand from the shift lever 5.

The shift knob 5A is mounted on the supporting shaft 6. The shift knob 5A has a substantially streamline shape protruding toward the side of the driver M (the driver's sheet not shown) from the right end portion 11b' of the meter visor 11b in a bulged state as shown in FIG. 2.

As shown in FIGS. 5A to 5C, the shift knob 5A includes a front portion 5a, a bulged portion 5b which is bulge-formed from the front portion 5a to the right rear portion 5b', a protruding portion 5c and gaps 5d, 5d which are formed from a right end portion 5b' to the front portion 5a for gripping. These protruding portion 5c and gaps 5d, 5d are formed to face to and be inclined with respect to the rear surface of the escutcheon cover 3 such that these protruding portion 5c and gaps 5d, 5d are positioned on the back side of the shift knob 5A from the viewpoint of the driver M. The protruding portion 5c and the gaps 5d, 5d are substantially formed on the back side of the bulged portion 5b so that the protruding portion 5c is fit between fingers.

The gaps 5d, 5d are formed to be curved gaps which substantially curve along the bulged curve of the bulged portion 5b in a plain view as shown in FIG. 5A. As shown in FIG. 5C, the gaps 5d, 5d are formed above and below the protruding portion 5c, respectively, in a side view and are gradually widened toward the front portion 5a from the right rear portion 5b'. On the other hand, the protruding portion 5c is formed to be gradually narrowed from the right rear portion 5b' toward the front portion 5a in the side view.

In the embodiment, the upper and lower gaps 5d, 5d are the same shape, however, the shapes of the gaps 5d, 5d may be different from each other.

The mounting bracket 15 includes, as shown in FIGS. 4A and 4B, a front plate 15a, a left leg portion 15d which extends from the left side portion of the front plate 15a, and a first right leg portion 15b and a second right leg portion 15c which extend from the right side portion of the front plate 15a. The mounting bracket 15 is fixed to the mounting portion 13a by the left leg portion 15d, the first and second right leg portions 15b, 15c. The left leg portion 15d and the second right leg portion 15c are fixed to the rear surface of the mounting portion 13a by bolts 15d' and 15c'. The first right leg portion 15b is fixed to the upper surface of mounting portion 13a by two bolts 15e', 15e'. The left leg portion 15d is formed longer than that of the second right leg portion 15c. With this configuration, when the mounting bracket 15 is fixed to the mounting portion 13a, the plate surface of the front plate 15a is inclined toward right.

The body 2 of the shift device 1 is fixed to the front plate 15a by three bolts 15a' (only two bolts are shown in FIG. 4B). Here, as the plate surface of the front plate 15a is inclined toward right as described above, the shift device 1 fixed to the front plate 15 is also inclined toward right. In short, the shift device 1 is fixed in a state where the shift device 1 is inclined away from the center axis O as shown in FIG. 3.

Figure 7:
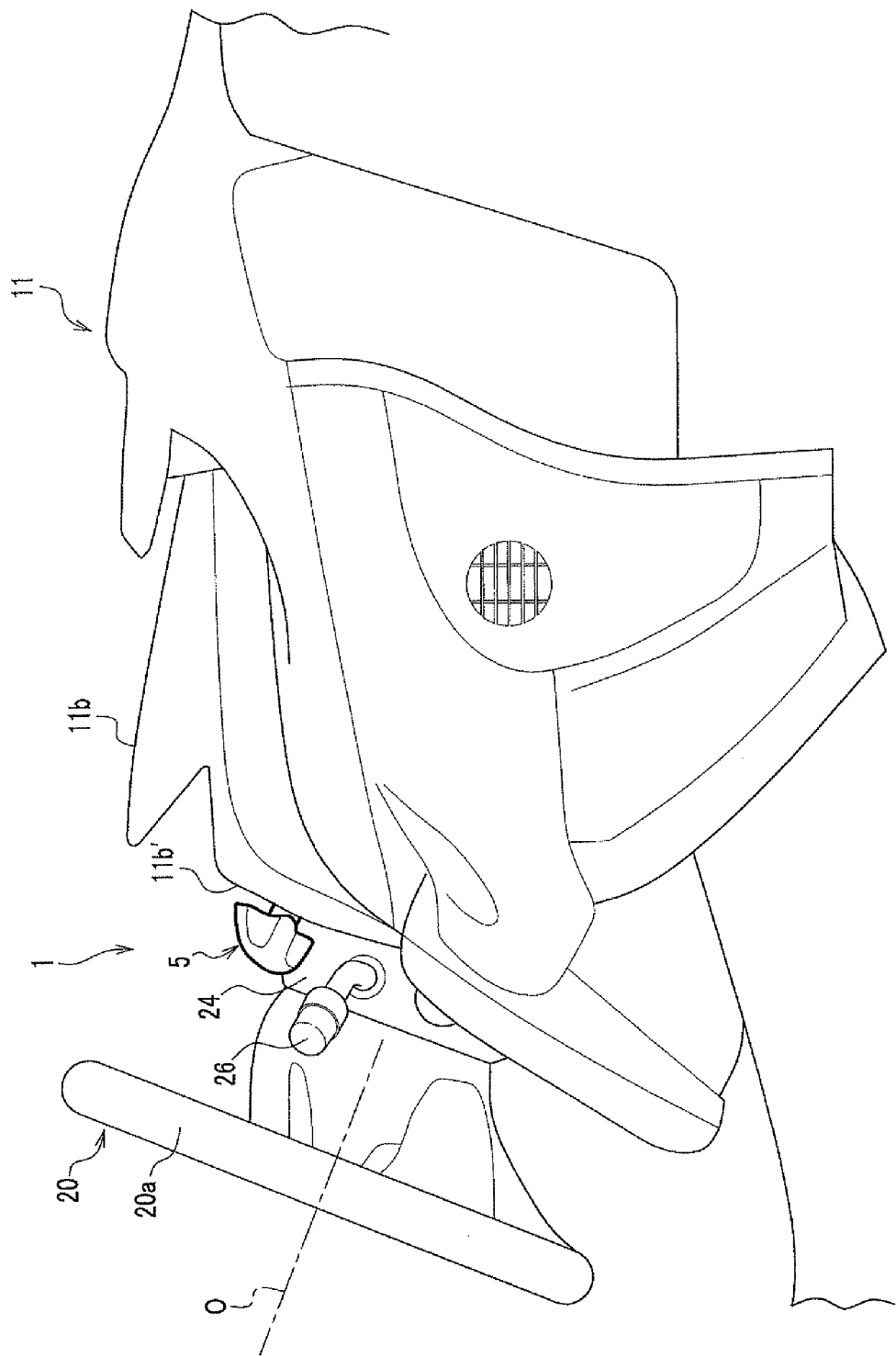
FIG. 7 is a view showing a position of the shift lever.

The shift device 1 including such a shift lever 5 is arranged on the right end portion 11b' of the meter visor such that the shift lever 5 is positioned in the area R1 (indicated by the shaded line) which is outside of the steering wheel 20 and upper than the center axis 20 of the steering wheel 20 from the viewpoint of the driver M as shown in FIG. 2. With this configuration, the steering wheel 20 does not block the driver M's view of the shift lever 5. Thus, it is easy to recognize the position of the shift lever 5. As the shift lever 5 is arranged outside of the steering wheel 20 from the viewpoint of the driver M, the operation of the shift lever 5 is not obstructed by e.g. an operation switch 26 for a window washer liquid (see FIG. 7, operation switches provided to the column cover 24 or an operation switch 26 for blinkers, see FIG. 2), which is often arranged in an area where the visibility of the driver M is interfered with by the steering wheel 20. This enhances the operability of the shift device 5.

Figure 6:
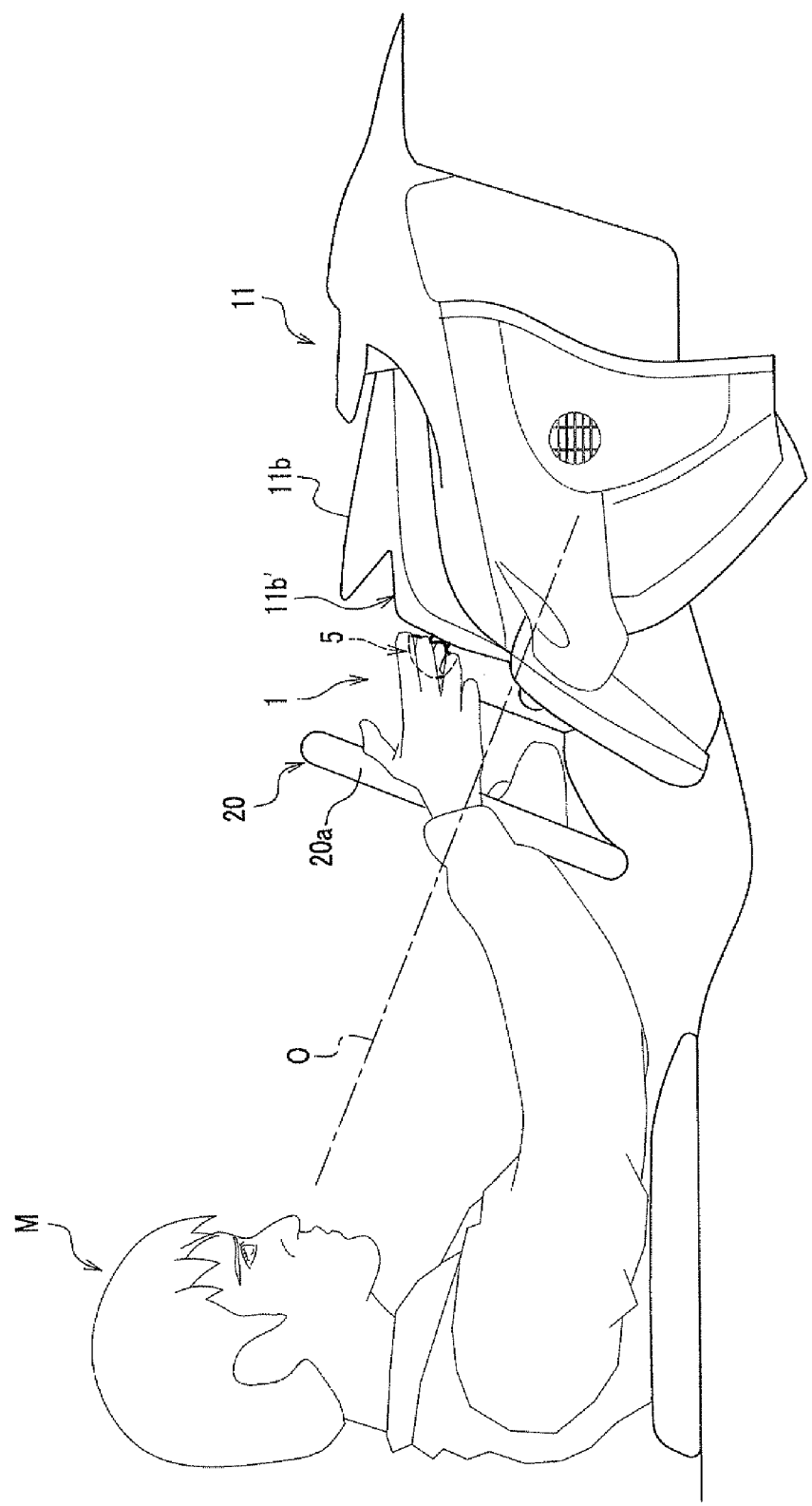
FIG. 6 is a view showing a position of the shift lever.

As the shift lever 5 is arranged in the area R1 which is outside of the steering wheel 20 and upper than the center axis 20 of the steering wheel 20 from the viewpoint of the driver M, the driver M is allowed to place his fingers in the gaps 5d, 5d (see FIGS. 5A and 5B) of the back side of the shift knob 5A just by extending his hand gripping the steering rim 20a toward the right end portion 11b' of the meter visor 11b as shown in FIG. 6 when operating the shift lever 5. At this time, the protruding portion 5c is placed between the fingers, which enhance the operability of the shift lever 5.

Figure 8A:
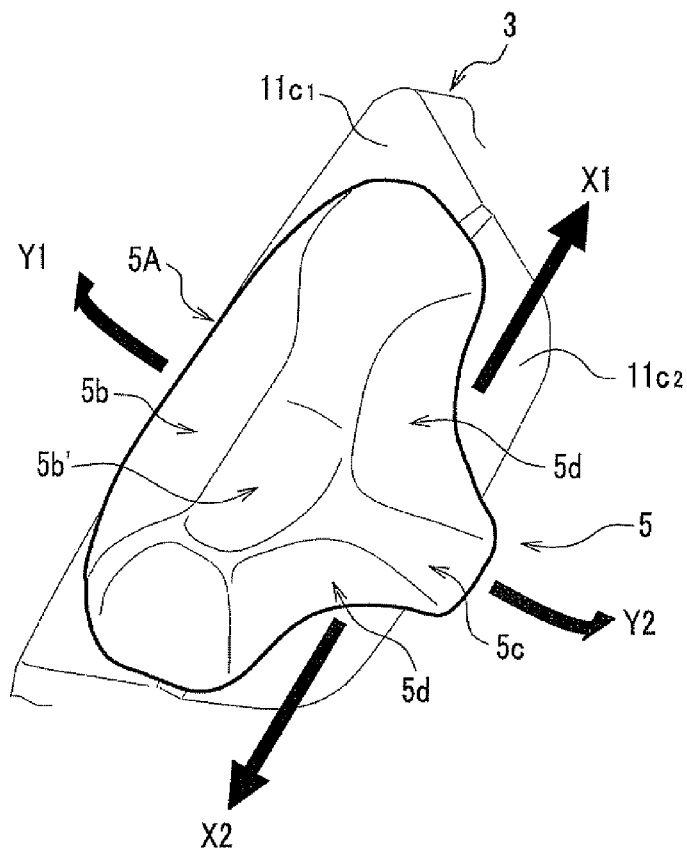
FIG. 8A is a side view of the shift lever showing the operation direction of the shift lever.
Figure 8B:
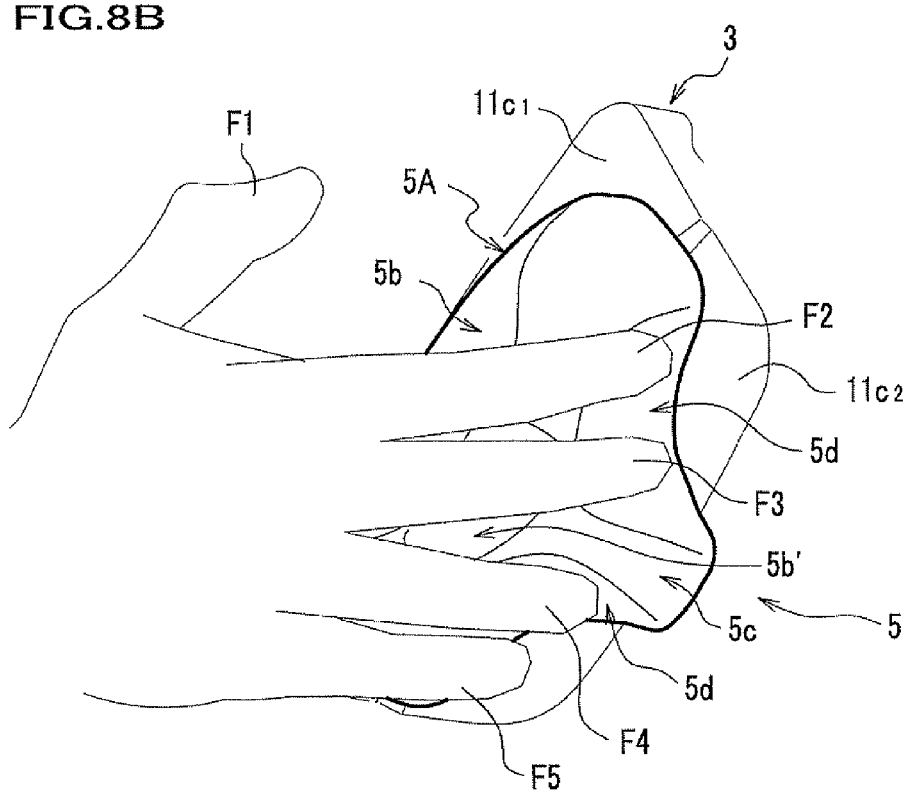
FIG. 8B is a side view showing the gripping of fingers around a shift knob.

FIG. 8A is a side view showing operation directions of the shift lever 5 when operating the shift lever 5. FIG. 8B is a side view showing the gripping of fingers around the shift knob 5A. As shown in FIG. 8A, the operation direction of the shift lever 5 is the up-down direction indicated by arrows X1, X2 and leftward direction indicated by Y1. The shift lever 5 is moved in the rightward direction indicated by the arrow Y2 in a process of the shift lever 5 returning to the momentary position (the home position H, see FIG. 2). In the example shown in FIG. 8B, a fore finger F2 and a middle finger F3 are placed in the upper gap 5d of the shift knob 5A, and a medicinal finger F4 and a little finger F5 are placed in the lower gap 5d, however, the shift knob 5A may be operated by the fingers in a different finger pattern. Thumb may be placed on the bulged portion 5b when operating the shift lever 5.

The movement of the shift lever 5 when operated is described below based on the shift positions (shift pattern) shown in FIG. 2. When the shift lever 5 is moved from the home position H to the drive range "D", for example, the shift lever 5 is firstly moved to the neutral range "N" from the home position "H" by moving the shift lever 5 in the direction indicated by the arrow Y1 while moving down the shift lever 5 in the direction indicated by the arrow X2 in FIG. 8A. Then, the shift lever 5 is further moved down in the direction indicated by the arrow X2 to be moved to the drive range "D". At this time, the request for the drive range "D" is detected by the shift device 1, and a signal controlling the switching of the range of the automatic transmission is transmitted to the automatic transmission control unit (not shown) from the body 2. Accordingly, the range of the automatic transmission is switched to the drive range "D". When the shift lever 5 is moved to the reverse range "R", the shift lever 5 is firstly moved from the home position "H" to the neutral range "N". Then, the shift lever 5 is further moved to the reverse range "R". This series of operation is configured to be more difficult than the movement toward the drive range "D" ("down", "sideward", "down") since the shift lever 5 must be moved "down", "sideward" and "up".

When the shift lever 5 is moved to the drive range "D", the finger is released from the shift knob 5A. The shift lever 5 is then moved back to the home position H (moved in the direction of "X1", "Y2" and "X1" in order) by an energizing force of e.g. a spring (not shown) through the gate groove along which the shift lever 5 has been moved. As the movement of the shift lever 5 in the rightward direction is performed by the energizing force of the momentary mechanism, the shift knob 5A is shaped to make the leftward movement (operation direction) of the shift lever 5 be easier.

As described above, a desired range can be selected just by extending the hand gripping the steering rim 20a toward the meter visor 11b of the instrumental panel 11, holding the shift knob 5A with his fingers and moving the shift lever 5 in a predetermine direction.

In accordance with the shift device 1 according to the above described embodiment, the shift lever 5 is arranged in the area R1 of the instrumental panel 11 which is outside of the steering wheel 20 and upper than the center axis O of the steering wheel 20 from the viewpoint of the driver M and protrudes toward the side of the driver M. Therefore, the shift lever 5 can be visually recognized easily without being hidden by the steering wheel 20 from the viewpoint of the driver M. Since the shift lever 5 is arranged on the right end portion 11b' of the meter visor 11b of the area R1 which is upper than the center axis O of the steering wheel 20 which is likely to be seen in the peripheral vision of the driver M, the position of the shift lever 5 can be easily recognized, providing an excellent visibility. As the shift lever 5 is arranged in the area R1 of the meter visor 11b and protrudes toward the side of the driver M, the operation of the shift lever 5 is not obstructed by other operation switches 26 which are provided to the column cover 24 on a side of the steering wheel 20. Thus, the operability of the shift lever 5 is enhanced.

As the shift lever 5 is arranged above the center axis O of the steering wheel 20, the shift lever 5 can be arranged in the vicinity of the steering wheel 20, which also enhances the operability of the shift lever 5.

As the shift lever 5 is arranged on the meter visor 11b and protrudes toward the side of the driver M, the driver's visual line can be smoothly moved from the meter display portion 11a to the shift lever 5, which provides an excellent visibility. It is possible to operate the shift lever 5 easily just by extending the hand gripping the steering wheel 20 toward the instrumental panel 11 in front of the steering wheel 20. Thus, the shift device 1 can be realized which further enhances its operability. The shift device 1 also realizes a natural operation feeling and allows a smooth shift operation since the shift lever 5 can be operated just by extending the hand gripping the steering wheel 20 to the instrumental panel 11 in front of the steering wheel 20. It is also possible to readily recognize the position of the shift lever 5 without visually checking the position of the shift lever 5 during driving, which allows the driver to operate the shift lever 5 easily while ensuring the front visual field.

Figure 9:
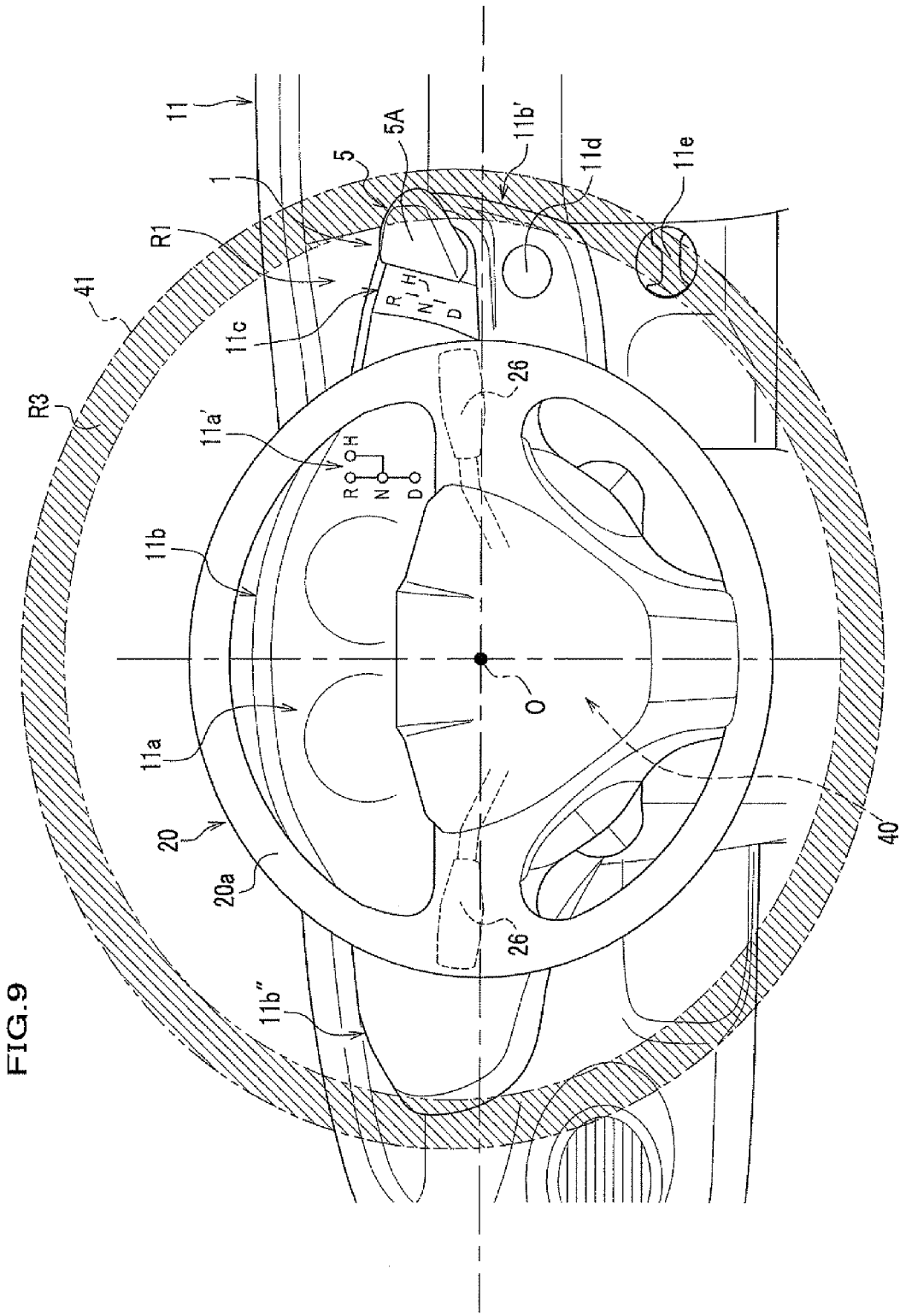
FIG. 9 is a view showing the positional relationship between an air bag and the shift lever.

FIG. 9 is a view showing a modification of the embodiment of the shift device 1. In this modification, the shift lever 5 is arranged in a position included an expansion area of an air bag 41 of the air bag system 40 provided at the center part of the steering wheel 20. Specifically, the shift lever 5 is arranged in an expansion area R3 of the air bag 41 from the viewpoint of the driver M.

To be more specific, the shift lever 5 is arranged in the area R1 which is outside of the steering wheel 20 and upper than the center axis O of the steering wheel 20 and also in the expansion area R3 of the air bag 41.

In this shift device 1, when the air bag system 40 is operated and the air bag 41 is expanded due to an impact applied by a collision, the air bag 41 is expanded between the shift lever 5 and the driver M. Therefore, there is no risk that the shift lever 5 comes in contact with the driver M, which advantageously eliminates the need to provide a shock absorbing mechanism to the shift lever 5. Even if the shift lever 5 protrudes toward the side of the driver, there is no need to provide a shock absorbing mechanism to the shift device 1, which makes the configuration of the shift device 1 be simpler and reduces the manufacturing cost thereof.

In this embodiment, the shift device 1 is provided to a left-hand drive automobile, however, the shift device 1 may be provided to a right hand drive automobile. In the case where the shift device 1 is provided to the right hand drive automobile as shown in FIG. 2 for example, the shift lever 5 can be arranged in an area R2 (a left end portion 11b" of the meter visor 11b) (indicated by the shaded part) which is outside of the steering wheel 20 and upper than the center axis O of the steering wheel 20 from the viewpoint of the driver M.

What is claimed is:

1. A shift device comprising a shift lever which operates a gear position of a transmission, the shift device comprising:
a shift knob which is provided at a distal end of the shift lever;
an escutcheon cover through which the shift lever is disposed;
a body which is covered by the escutcheon cover;
a mounting bracket which connects the body to a steering hanger beam, wherein
the shift knob and the escutcheon cover are arranged in such a manner that a part of the shift knob and a part of the escutcheon cover are arranged on an outer side in a vehicle width direction with respect to the mounting bracket; and the shift lever and the escutcheon cover are arranged in an area of an instrumental panel which is outside of a steering wheel and above the center axis of the steering wheel from a view point of a driver and protruding toward the driver.

2. The shift device according to claim 1, wherein a center part of the steering wheel is provided with an air bag system, and the shift lever is arranged in an expansion area of an air bag of the air bag system from the viewpoint of the driver.

3. The shift device according to claim 1 wherein the instrumental panel includes a meter visor which surrounds a display device displaying a status of a vehicle, and the shift lever is arranged in the meter visor and protrudes toward the driver.

4. The shift device according to claim 1, wherein the escutcheon cover includes on a surface thereof to which the shift knob is provided a step surface where a part of the surface to which the shift knob is opposed is lower in height in an axis direction of the shift lever than the other part of the surface.

5. The shift device according to claim 1, wherein the mounting bracket includes a front plate to which the body is connected and a leg portion which connects the front plate to the steering hanger beam, wherein the leg portion is connected to the steering hanger beam in such a manner that a plate surface of the front plate is inclined away from the center axis of the steering shaft of which distal end is provided with the steering wheel.

6. The shift device according to claim 5, wherein the escutcheon cover includes on a surface thereof to which the shift knob is provided a step surface where a part of the surface to which the shift knob is opposed is lower in height in an axis direction of the shift lever than the other part of the surface.

* * * * *